United States Patent
Zulpa et al.

(10) Patent No.: US 6,721,746 B2
(45) Date of Patent: Apr. 13, 2004

(54) METHOD AND SYSTEM FOR FACILITATING PRODUCTION CHANGES IN AN EXTENDED ENTERPRISE ENVIRONMENT

(75) Inventors: Paul A. Zulpa, Woodbury, CT (US); Sachin S. Chandra, Fishkill, NY (US); John S. Maresca, Hopewell Junction, NY (US)

(73) Assignee: International Business Machines Corporation, Armonk, NY (US)

(*) Notice: Subject to any disclaimer, the term of this patent is extended or adjusted under 35 U.S.C. 154(b) by 490 days.

(21) Appl. No.: 09/749,053

(22) Filed: Dec. 27, 2000

(65) Prior Publication Data

US 2002/0083057 A1 Jun. 27, 2002

(51) Int. Cl.⁷ .............................................. G06F 17/30
(52) U.S. Cl. .................................. 707/10; 707/9; 707/3; 707/104.1; 705/29; 709/203; 709/219; 713/201; 713/202
(58) Field of Search ......................... 707/3, 9, 10, 104.1; 709/201, 203, 219; 705/1, 7, 8, 28, 29; 713/201, 202

(56) References Cited

U.S. PATENT DOCUMENTS 6,539,386 B1 * 3/2003 Athavale et al. ............... 707/10
6,546,374 B1 * 4/2003 Esposito et al. ............... 705/27
2002/0026339 A1 * 2/2002 Frankland et al. ............. 705/7
2002/0052807 A1 * 5/2002 Han et al. ....................... 705/27
2002/0082967 A1 * 6/2002 Kaminsky et al. ............. 705/37

* cited by examiner

Primary Examiner—Jean R. Homere
Assistant Examiner—Leslie Wong
(74) Attorney, Agent, or Firm—Alison D. Mortinger; Cantor Colburn LLP

(57) ABSTRACT

A computer-based method and system for facilitating production changes in an extended enterprise via a network environment. The system includes a manufacturing enterprise system including a host system operating a web server, a data storage device in communication with the host system, and at least one terminal for accessing the host system. The manufacturing enterprise system runs on a network that is coupled to the Internet and is accessible to an outside enterprise or trading partner identified with having proper access permissions. The server executes a set of programs for the process and product change notification application of the present invention. PCN notices and EOL requests are inputted into the manufacturing enterprise system via the process and product change notification application where required data are supplied, destination resources of affected parties are determined and decisions are calculated according to these inputs.

24 Claims, 3 Drawing Sheets

METHOD AND SYSTEM FOR FACILITATING PRODUCTION CHANGES IN AN EXTENDED ENTERPRISE ENVIRONMENT

BACKGROUND OF THE INVENTION

This invention relates generally to supply chain management of outsourced goods, and more particularly, this invention relates to a method and system for facilitating production changes and end-of-life requests among supply chain partners in a multi-enterprise environment via a networked system.

With the advent of the Internet and related technologies, complex networking systems have evolved that enable distant trading partners operating disparate computer systems to interact with one another. The Internet provides a ubiquitous message routing architecture that supports reliable inter-business connectivity around the world, based on common communication protocols and common standards for system interoperability. Further, the Internet and related intranet and extranet technologies offer a relatively low cost of entry, making them practical for use by large and small businesses alike. Web-based security issues have been minimized through the use of intranets that connect a business' internal processes to the applications and data they need and extranets that connect external processes to the applications and data they need. Firewalls or security devices are added to protect against unauthorized access to the internal network and to isolate unauthorized Internet access from the extranet. With this new technology in place, existing trading barriers between trading partners can be removed, allowing for a synchronized flow of information.

A recent trend in electronics manufacturing involves contracting out some or all of the manufacturing of a company's products to third party manufacturers which then build these products according to specification. This arrangement, known as outsourcing, results where the original manufacturer (called an Original Equipment Manufacturer, or OEM) buys assemblies in bulk from third-party contract manufacturers and then customizes them for a particular application. It then markets and sells the customized equipment under its own name. By outsourcing the manufacturing and assembly of these goods, established OEMs are able to focus on other business areas such as new product development and customer relationship management. Additionally, as product designs and components are becoming increasingly complex and frequently updated, a contract manufacturer with specialized skills may be better equipped to accommodate the changing technology. By outsourcing to meet peak demands, an OEM may be able to avoid having to build new facilities and/or hire new people.

An OEM who is outsourcing the manufacturing of its products needs to be able to collaborate with its supply chain partners before, during, and after the manufacturing cycle in order to achieve maximum efficiency of the production process. One area of collaboration is the production change processes including process/product change notifications and end-of-life requests. Product or process change notifications (PCNs) are documents that supply chain partners send to an OEM to notify the OEM that either something in the devices under production is changing or a production process technique is changing which may trigger the need to re-qualify a device or process. The re-qualification process tests the new changes to ensure compatibility with larger assemblies or final products for which the devices will be incorporated. End-of-Life (EOL) requests are documents submitted by a supplier who has information about a product or material that has been, or is expected to be, purchased by the OEM or authorized manufacturer and will no longer be available for purchase. This gives the OEM advance warning that a change in production or process may become necessary in the future and that decisions regarding alternative processes or materials must be made. Numerous such notices are received by a typical OEM every year, often in a haphazard fashion, such as memorandums, e-mail, telephone conversations, and so on. For an OEM who has facilities all over the world, this unsystematic method of notification may result in a PCN being mis-delivered, or perhaps not received by the appropriate individuals at all. Various geographically dispersed facilities of an OEM may be involved with a program or manufacturing plan that is affected by the PCN, making it increasing difficult to organize and track the flow of information from facility to facility. If one or more divisions or facilities of an OEM does not receive the PCN data, its manufacturing processes can become significantly hampered causing production delays and increased associated manufacturing costs. It is therefore desirable to provide a method and system that facilitates the PCN/EOL processes so that the PCN information can be properly and quickly delivered to all involved sites and related locations of the OEM and production processes can be streamlined.

SUMMARY OF THE INVENTION

An exemplary embodiment of the invention relates to a computer-based method and system for facilitating production changes in an extended enterprise via a network environment. The system includes a manufacturing enterprise system comprising a host system operating a web server, an applications server, and a database manager; a data storage device in communication with the host system, and at least one terminal for accessing the host system. The manufacturing enterprise system runs on a network that is coupled to the Internet and is accessible to an outside enterprise or trading partner identified with having proper access permissions. The applications server executes a set of programs for managing the manufacturing enterprise system, including the process and product change notification application of the present invention. PCN notices and EOL requests are inputted into the manufacturing enterprise system via the process and product change notification application where required data are supplied, destination resources of affected parties are determined and decisions are calculated according to these inputs.

BRIEF DESCRIPTION OF THE DRAWINGS

Referring now to the drawings wherein like elements are numbered alike in the several FIGURES.

DETAILED DESCRIPTION OF THE PREFERRED EMBODIMENT

The process and product change notification application is a tool used to facilitate the production change processes in an extended enterprise environment. It provides a centralized storage system in which PCN/EOL documents can be created, edited, viewed, tracked and closed by a variety of users inside and outside of an organization on a tiered-access basis. It further allows outsiders of the organization to submit comments and view a limited portion of information in the PCN database via a secure network connection. System administrators for the organization establish and maintain the access permissions and set parameters for users of the process and product change notification tool in keeping with the objectives of the organization.

Figure 1:
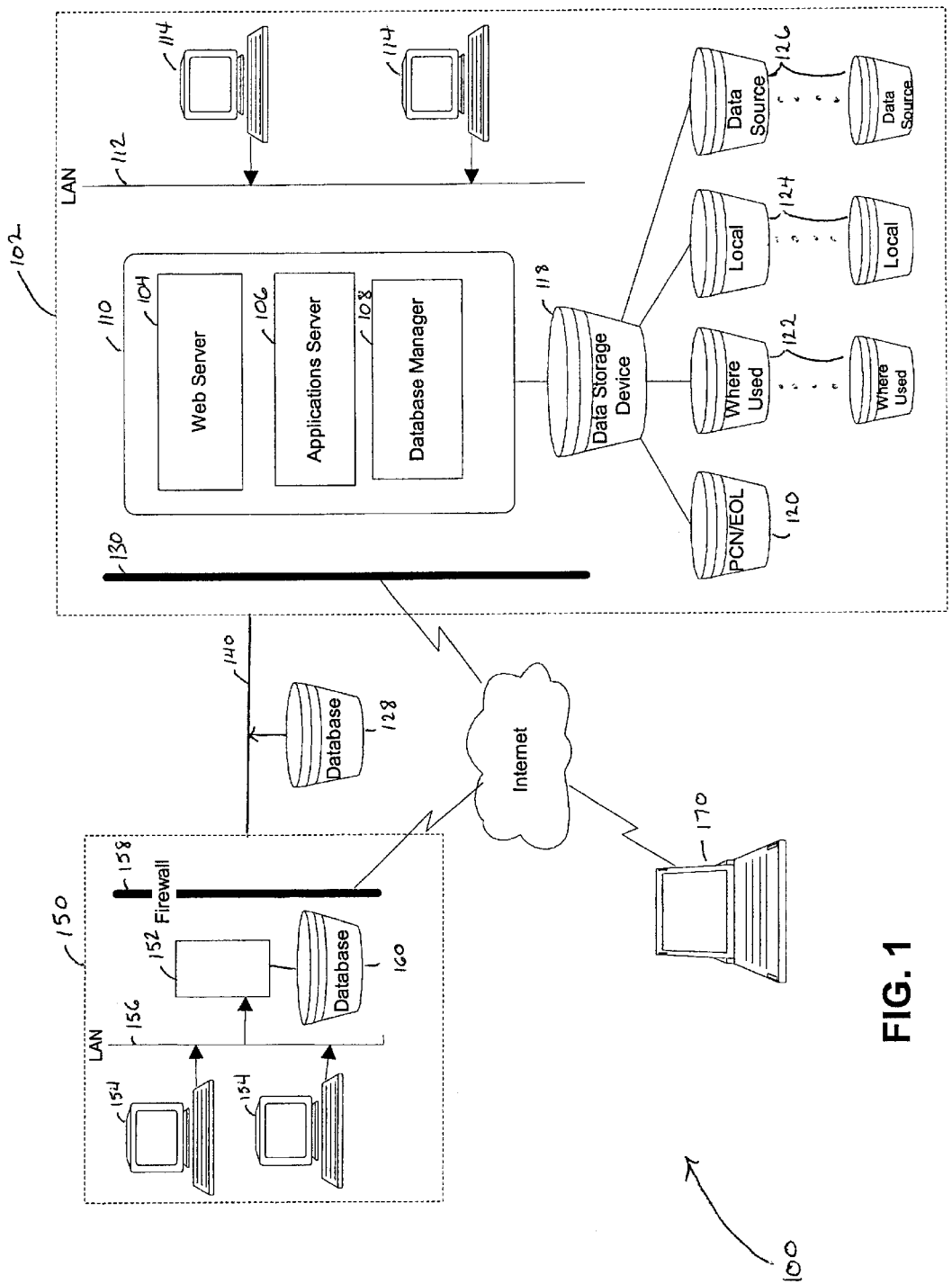
FIG. 1 is a block diagram of a portion of the system that includes a plurality of workstations and servers on which the process and product change notification application is implemented.

In an exemplary embodiment, the process and product change notification application is implemented through a networked system such as that shown in FIG. 1. Although not necessary to realize the advantages of the present invention, system 100 may be part of a wide area network in which different geographical locations are interconnected, either by high-speed data lines or by radio links, interconnecting hundreds of workstations at widely disparate locations. In the simplified diagram of FIG. 1, system 100 includes an organization 102 comprising a web server 104, an applications server 106, and a database server 108 that are located on a host system 110 and connected through a network 112 to workstations 114. The term "organization" refers to the system implementing the process and product change notification application. Network 112 may comprise a LAN, a WAN, or other network configuration known in the art. Further, network 112 may include wireless connections, radio-based communications, telephony-based communications, and other network-based communications. For purposes of illustration, however, network 112 is a LAN. A firewall 130 limits access to organization 102 to those users outside of organization 102 who possess proper access permissions. Firewall 130 may comprise a gateway router, proxy server or a combination of similar hardware/software devices readily known by those skilled in the art.

Host system 110 is running suitable web server software designed to accommodate various forms of communications and which allows information in data storage device 118 to be published on a web site. For purposes of illustration, host system 110 is running Lotus Domino (TM) as its server software. Applications server 106 executes the process and product change notification tool, among other applications utilized by organization 102. Applications server 106 is also running a groupware application such as Lotus Notes (TM) which allows remote users to access information through its replication capabilities, provides e-mail services, and supports a secure extranet architecture.

Data storage device 118 resides within intranet 112 and may comprise any form of mass storage device configured to read and write database type data maintained in a file store (e.g., a magnetic disk data storage device). Data storage device 118 is logically addressable as a consolidated data source across a distributed environment such as network system 100. The implementation of local and wide-area database management systems to achieve the functionality of data storage device 118 will be readily understood by those skilled in the art. Information stored in data storage device 118 is retrieved and manipulated via database server 108.

Data storage device 118 provides a repository for databases including a PCN/EOL database 120, "where used" databases 122, local databases 124, data resource databases 126, and any other information desired by organization 102 for use by the process and product change notification tool. These features are further described herein.

System 150 comprises a web server 152 that connects workstations 154 to an intranet 156 and to the Internet. Firewall 158 provides security and protection against unauthorized access to internal network information from outside sources. Each of workstations 154 may access web server 152 via internal web browsers (not shown) located on workstations 154. A data storage device 160 is coupled to server 152. Selected data fields of PCN database 120 are replicated to database 128 and are accessible to system 150 via extranet 140. PCNs submitted by system 150 are loaded into PCN database 120 via a supplier portal device or application such as the one described in U.S. Pat. Application Ser. No. 09/658,257 filed on Sep. 8, 2000, entitled "E-Collaboration Commodity Management System and Method", which is incorporated herein by reference in its entirety. System 150 is typically an existing supplier or contract manufacturer of organization 102. The terms 'supplier' or 'contract manufacturer' and 'trading partner' are used interchangeably throughout this description. Remote workstation 170 is coupled to organization 102 via a web browser (not shown) and modem (not shown) for communicating with organization 102.

Various types of users utilize the process and product change notification tool and are described herein as follows:

Divisional Users. Divisional users are typically engineers and developers of organization 102. Divisions of organization 102 are classified or sorted according to the product being manufactured. For example, one division may be dedicated to manufacturing/assembling personal computers. A second division might be responsible for the production of mainframe computers. A third division might involve storage devices. Divisional users may view, update, and transfer documents in PCN/EOL database 120 to other authorized users, but are limited to modifying only those documents relating to their division.

Suppliers/Contract Manufacturers. These users are external to the organization but have a need to access certain information contained in PCN/EOL database 120. These users are restricted to viewing through the Internet a limited segment of information in PCN/EOL database 120 to ensure the overall confidentiality of the documents contained therein. Trading partners at system 150 can input comments or attachments through replicated database 128 and submit them via extranet 140 to PCN/EOL database 120.

Reviewing Engineers. Reviewing engineers associated with a division of organization 102 receive PCNs and EOLs from a PCN coordinator for action. These engineers are designated by organization 102 to take responsibility for PCNs as specified by the PCN coordinator. Reviewing engineers typically handle the tracking and control of those PCNs which affect a small, limited amount of products or assemblies relating to a group or division. They are generally employed by the process and product change notification tool when site forms are deemed to be unnecessary. Reviewing engineers provide feedback to the PCN coordinator as needed and close a PCN once it has been completed.

Site focal point personnel. These users are typically employed when a PCN impacts a large number of site locations, commodities, programs, and/or divisions of organization 102, such that a PCN site form is created by the process and product change notification tool and then broken down into smaller manageable site forms for action. Site focal point personnel may be assigned to a particular program or product or commodity as desired by organization 102. These users track the progress of their own 'micro' site forms and report back to either a designated site manager or to the PCN coordinator.

PCN Coordinator. The PCN coordinator facilitates the processing of PCNs and EOLs as they are received by supply chain partners. The PCN coordinator ensures that all required information is included in the PCN and that all necessary or affected parties are quickly informed of PCN/EOL receipts. The PCN coordinator also tracks the progress of each PCN of organization 102 so that all involved parties follow through with whatever actions are required by the PCNs/EOLs.

Access control lists store the names of authorized users of the databases stored in data storage device 118 and each user is assigned an access level by an administrator or other designated representative of organization 102. Only these administrators or designated personnel can add, modify or delete authorized users in the access control lists.

Figure 2:
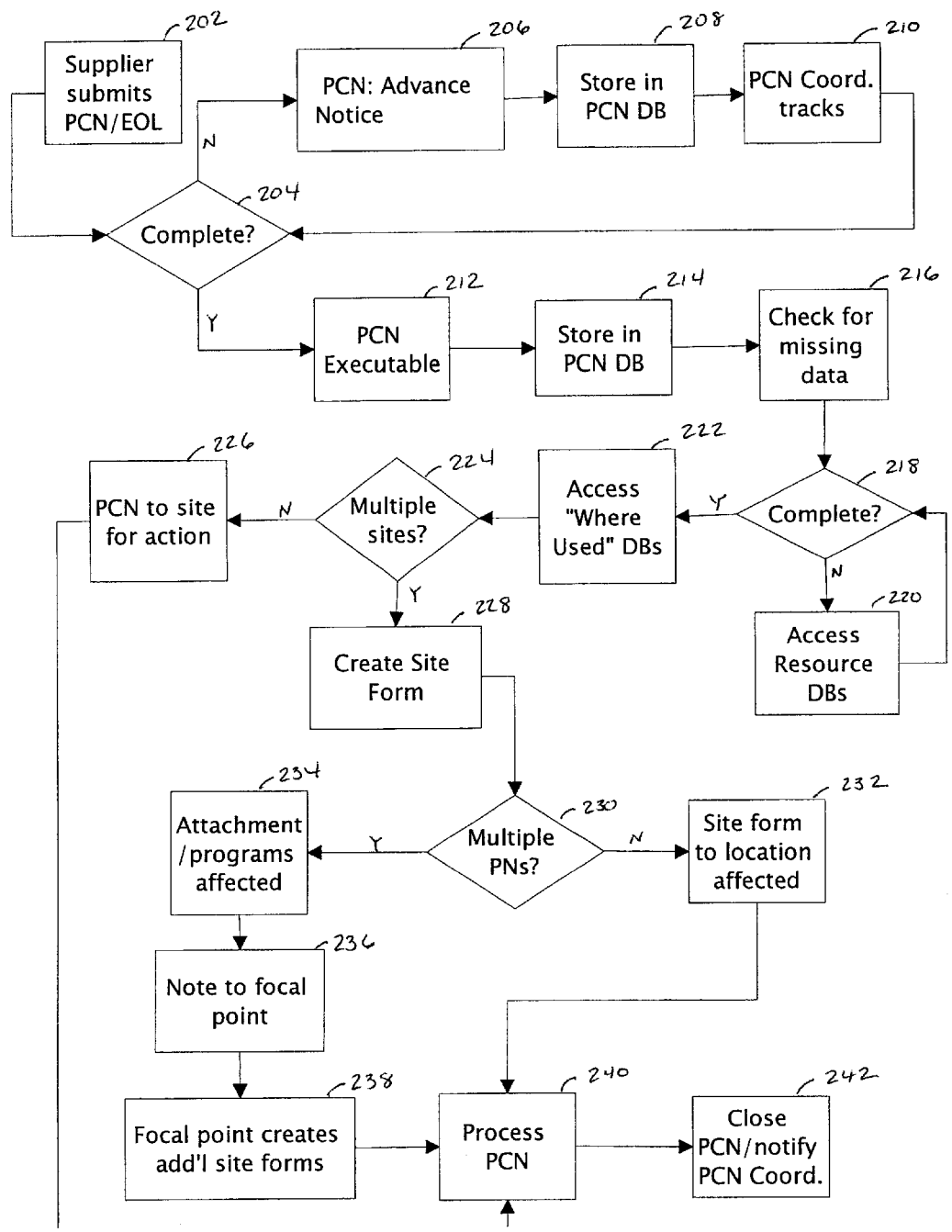
FIG. 2 is a flowchart describing the PCN/EOL process.

An sample PCN notification process flow is described in FIG. 2. A supplier at system 150 submits a PCN to organization 102 at step 202. The process and product change notification tool checks the PCN for missing data at step 204. If data is missing from the PCN, the process and product change notification tool classifies the PCN as an "Advance Notice" at step 206. This means that the PCN remains pending in the system while additional information is gathered, either by supplier 150 or organization 102 personnel. The PCN is stored in PCN database 120 at step 208. The PCN Coordinator tracks the status of each PCN in the database and sends inquiries to supplier 150 if the PCN remains in PCN database 120 without further updates from supplier 150 after a given period of time. The PCN Coordinator is the nerve center of the process and product change notification process—receiving, forwarding, and processing PCN data as it advances through the system. If the information in the PCN is complete, flow proceeds to step 212 where it is marked, "Executable" by the process and product change notification application. This status means that the PCN is now ready to be operated upon by organization 102. The PCN is again stored in PCN database 120 awaiting further action by the process and product change notification tool. The process and product change notification tool can prioritize the order in which PCNs stored in database 120 receive attention. The process and product change notification tool checks each PCN for missing part numbers at step 216. If part numbers are missing at step 218, the process and product change notification tool queries resource databases 126 for this information. Examples of such databases may include commercial software databases such as Aspect (TM) which provides a vast array of data pertaining to parts known in the industry. Once the information is complete, flow proceeds to step 222 where the process and product change notification tool determines which sites, divisions, commodities, etc., utilize the particular parts affected by the PCN. Examples of such databases include engineering databases, development databases, corporate databases, and manufacturing databases located at various locations and accessible to organization 102. The process and product change notification tool notes the number of sites affected by the PCN at step 224. If only one site is affected, the process and product change notification tool transmits the PCN data to that particular site for action at step 226. In this case, a representative, or reviewing engineer at the site is responsible for processing the PCN. If on the other hand, multiple sites are affected, the process and product change notification tool creates a site form for each site affected at step 228. The process and product change notification tool then examines the number of part numbers listed for each site at step 230. If a low number of part numbers are involved, the site form is transmitted to the location affected for action at step 232. If multiple part numbers are involved, the process and product change notification tool attaches a listing of the programs affected for each site before transmitting the site form to the location at step 234. A notice is sent to the contact person, or focal point representative, who is primarily involved with the site and program at step 236. If desired, the contact person, or focal point, may create additional site forms breaking down the information into smaller items, making the site form easier to manage at step 238. Regardless of the number of sites, programs, or part numbers affected, all PCNs are processed at step 240. At this point, the information in the PCN is evaluated by designated persons or divisions who must then make a determination of whether the items on the PCN require re-qualification before manufacturing proceeds. Once all site forms, or alternatively, all PCNs in the event only one site is involved, are processed, the PCN is closed at step 242 and the PCN coordinator is notified accordingly.

Figure 3:
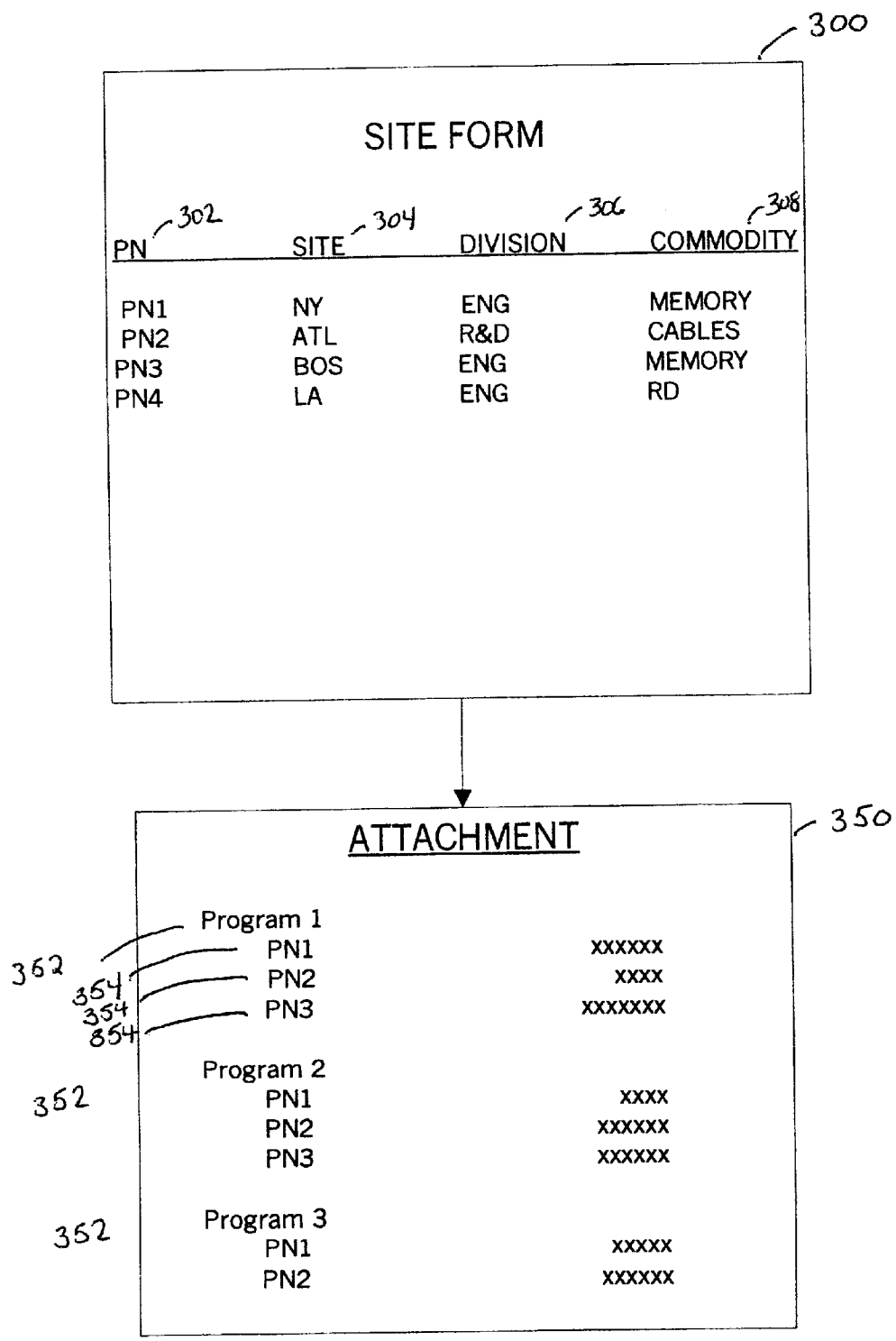
FIG. 3 illustrates an exemplary site form used by the process and product change notification application.

FIG. 3 illustrates an exemplary site form 300 that is used by the process and product change notification tool to document PCN information. Information provided on site form 300 includes all part numbers 302 affected by the PCN, the sites 304 which utilize these part numbers listed, the divisions 306 of organization 102 that are involved with the part numbers, as well as the commodities 308 affected. Site form 300 includes an attachment 350 which further breaks down the information provided in site form 300 into more manageable sections, such as programs 352 involved with the PCN along with their corresponding part numbers 354. Organization 102 may choose to customize the above sections in order to better represent its organizational structure.

As described above, process and product change notification tool streamlines the PCN/EOL processes that exist in virtually every outsourced manufacturing environment. The PCN and EOL data are stored in a centralized location whereby the PCN application distributes the data to key personnel for action. The PCN application tracks the progress of the activities to ensure they are properly addressed and completed. Electronic collaboration between suppliers and the enterprise allows for quicker turnaround times for information and actions resulting in a more efficient production cycles.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for facilitating production changes in a communications network environment, comprising:

receiving a request from a first enterprise system to contact a web site maintained by a second enterprise system;

said second enterprise system authenticating a user ID and password of a user of said first enterprise system;

receiving a request to initiate an activity, said activity provided by said second enterprise system among a plurality of activity options;

said second enterprise system retrieving data from at least one database, said data corresponding to said activity selected; and transmitting said data to said first enterprise system;

replicating at least one data field of a database associated with said second enterprise system resulting from a request by said first enterprise system to submit a process change notification, said process change notification associated with a first of said activity options;

providing access to said at least one data field;

displaying a form for said process change notification;

receiving response data from said first enterprise system, said response data provided in said form;

generating a process change notification record; and storing said process change notification record in said database:

wherein said second enterprise system includes a process and product change notification application for executing said activity options.

2. The method of claim 1, further comprising:

association said process change notification record with at least one entity within said second enterprise system, said entity including at least one of:

a division;

a commodity;

a process change notification coordinator;

a program; and a site location:

wherein said associating said process change notification record with said at least one entity includes;

accessing data from local and non-local databases; and identifying affected locations of said process change notification record:

wherein further, said identifying affected locations of said process change notification record includes matching part numbers on said process change notification record to part numbers stored in said local and non-local databases.

3. The method of claim 2, wherein said associating said process change notification record with said at least one entity includes:

sending a notification to said at least one entity; and making said process change notification record available to said at least one entity.

4. The method of claim 2, further comprising:

evaluating said process change notification record, wherein said evaluating includes checking for missing data.

5. The method of claim 1, wherein said communications network environment includes a extranet.

6. The method of claim 1, wherein said first enterprise system is a supplier.

7. The method of claim 1, wherein said first enterprise system is a contract manufacturer.

8. The method of claim 1, wherein said first enterprise system is a trading partner.

9. A method for facilitating production changes in a communications network environment, comprising:

processing process change notification data;

transmitting said process change notification data to at least one user system;

tracking said process change notification data via said communications network environment;

storing results of said tracking in a database;

wherein said processing process change notification includes;

determining a number of sites affected by said process change notification data;

creating at least one site form based upon said number of sites affected;

determining a quantity of part numbers affected;

creating at least one attachment based upon said quantity of part numbers affected, wherein said attachment includes a notice to a focal point;

closing said process change notification data;

replicating at least one data field of database associated with second enterprise system resulting from a request by a first enterprise system to submit a process change notification, said process change notification associated with an activity option;

providing access to said at least one data field;

displaying a form for said process change notification;

receiving response data from said first enterprise system, said response data provided in said form;

generating a process change notification record; and storing said process change notification record in said database.

10. The method of claim 9, wherein said focal point creates at least one micro site form.

11. The method of claim 9, wherein said communications network environment includes an extranet.

12. A system for facilitating production changes in a communications network environment, comprising:

a host system including a web server, an applications server, and a database server;

a data storage device in communication with said host system, said data storage device storing:

a process change notification database;

at least one where used database;

at least one local database; and at least one data source database;

process and product change notification software application being executed by said host system;

a firewall in communication with said host system, a workstation; and a computer network connecting the host system to the workstation, wherein information inputted into the workstation is transferred to the host system and made available to the process and product change notification software application, wherein said process and product change notification software performs:

replicating at least one data field of a database associated with a second enterprise system resulting from a request by a first enterprise system to submit a process change notification, said process change notification associated with an activity option;

providing access to said at least one data field;

displaying a form for said process change notification;

receiving response data from said first enterprise system, said response data provided in said form;

generating a process change notification record; and storing said process change notification record in said database.

13. The system of claim 12, wherein said communication is via an extranet.

14. A storage medium encoded with machine-readable computer program code for facilitating production changes in a communications network environment, the storage medium including instructions for causing an enterprise system to implement a method comprising:

receiving a request from a first enterprise system to contact a web site maintained by a second enterprise system;

said second enterprise system authenticating a user ID and password of a user of said first enterprise system;

receiving a request to initiate an activity, said activity provided by said second enterprise system among a plurality of activity options;

said second enterprise system retrieving data from at least one database, said data corresponding to the activity selected;

transmitting said data to said first enterprise system;

replicating at least one data field of a database associated with said second enterprise system resulting from a request by said first enterprise system to submit a process change notification, said process change notification associated with a first of said activity options;

providing access to said at least one data field;

displaying a form for said process change notification;

receiving response data from said first enterprise system, said response data provided in said form;

generating a process change notification record; and storing said process change notification record in said database wherein said second enterprise system includes a process and product change notification application for executing said activity options.

15. The storage medium of claim 14, further comprising instructions for causing a computer to implement:

associating said process change notification record with at least one entity within said second enterprise system, said at least one entity comprising at least one of:

a division;

a commodity;

a process change notification coordinator;

a program; and a site location:

wherein said associating said process change notification record with said at least one entity includes:

accessing data from local and non-local databases; and identifying affected locations of said process change notification record;

wherein further, said identifying said affected locations includes matching part numbers on said process change notification record to part numbers stored in said local and non-local databases.

16. The storage medium of claim 15, wherein said associating said process change notification record with said at least one entity includes:

sending a notification to said at least one entity; and making said process change notification record available to said at least one entity.

17. The storage medium of claim 15, further comprising instructions for causing a computer to implement:

evaluating said process change notification record, wherein said evaluating includes checking for missing data.

18. The storage medium of claim 14, wherein said communications network environment includes an extranet.

19. The storage medium of claim 14, wherein said first enterprise system is a supplier.

20. The storage medium of claim 14, wherein said first enterprise system is a contract manufacturer.

21. The storage medium of claim 14, wherein said first enterprise system is a trading partner.

22. A storage medium encoded with a machine-readable computer program code for facilitating production changes in a communications network environment, the storage medium including instructions for causing an enterprise system to implement a method comprising:

processing process change notification data;

transmitting said process change notification data to at least one user system;

tracking said process change notification data via said communications network environment;

storing results of said tracking in a database:

wherein said processing process change notification data includes:

determining a number of sites affected by said process change notification data;

creating at least one site form based upon said number of sites affected;

determining a quantity of part numbers affected;

creating at least one attachment based upon said quantity of part numbers affected, wherein said attachment includes a notice to a focal point;

closing said process change notification data, replicating at least one data field of a database associated with a second enterprise system resulting from a request by a first enterprise system to submit a process change notification, said process change notification associated with an activity option;

providing access to said at least one data field;

displaying a form for said process change notification;

receiving responds data from said first enterprise system, said response data provided in said form;

generating a process change notification record; and storing said process change notification record in said database.

23. The storage medium of claim 22, wherein said focal point creates at least one micro site form.

24. The storage medium of claim 22, wherein said communications network environment includes an extranet.

* * * * *